(12) United States Patent
Layfield

(10) Patent No.: US 6,634,077 B2
(45) Date of Patent: Oct. 21, 2003

(54) COMBINED CONNECTING AND ALIGNMENT METHOD FOR COMPOSITE FIBER BUILDING PANELS

(75) Inventor: Derek John Layfield, Braeside (AU)

(73) Assignee: Affordable Building Systems, Whitewright, TX (US)

( * ) Notice: Subject to any disclaimer, the term of this patent is extended or adjusted under 35 U.S.C. 154(b) by 0 days.

(21) Appl. No.: 10/200,701

(22) Filed: Jul. 22, 2002

(65) Prior Publication Data

US 2003/0016992 A1 Jan. 23, 2003

Related U.S. Application Data

(60) Provisional application No. 60/306,751, filed on Jul. 20, 2001.

(51) Int. Cl.[7] ............................................. B23P 11/00
(52) U.S. Cl. ................ 29/525.13; 403/294; 403/408.1; 52/585.1; 156/304.3
(58) Field of Search ......................... 29/525.01, 525.13, 29/525.15; 403/408.1, 292, 294; 52/586.1, 585.1; 144/353, 354; 156/91, 66, 304.3

(56) References Cited

U.S. PATENT DOCUMENTS

| | | | |
|---|---|---|---|
| 3,158,960 A | 12/1964 | Newton et al. | |
| 3,246,436 A | 4/1966 | Roush | |
| 3,437,360 A * | 4/1969 | Gould et al. | 52/586.1 |
| 3,674,068 A * | 7/1972 | Lucci | 403/292 |
| 3,740,909 A | 6/1973 | Stinnes | |
| 3,797,190 A | 3/1974 | Widdowson | |
| 3,855,754 A * | 12/1974 | Scoville et al. | 403/401 |
| 4,123,885 A | 11/1978 | Scott | |
| 4,184,301 A | 1/1980 | Anderson et al. | |
| 4,443,988 A * | 4/1984 | Coutu, Sr. | 52/586.1 |
| 4,641,988 A * | 2/1987 | Ganner | 403/245 |
| 4,685,263 A | 8/1987 | Ting | |
| 4,751,125 A | 6/1988 | Ofterdinger | |
| 5,004,027 A * | 4/1991 | Legler et al. | 144/136.9 |
| 5,257,654 A * | 11/1993 | Bean et al. | 144/136.95 |
| 5,425,210 A | 6/1995 | Zafir | |
| 5,458,433 A * | 10/1995 | Stastny | 403/408.1 |
| 5,529,428 A * | 6/1996 | Bischof | 403/408.1 |
| 5,730,544 A * | 3/1998 | Dils et al. | 403/292 |
| 5,921,046 A | 7/1999 | Hammond, Jr. | |
| 6,253,511 B1 | 7/2001 | Boyer | |
| 6,260,329 B1 | 7/2001 | Mills | |
| 6,305,142 B1 | 10/2001 | Brisson et al. | |
| 6,402,415 B1 * | 6/2002 | Eberle, III | 403/231 |

* cited by examiner

Primary Examiner—David P. Bryant
(74) Attorney, Agent, or Firm—Robert H. Frantz; Robert W. Brown

(57) ABSTRACT

A connector and connection system useful in the building and construction industries for joining two substantially planar composite fiber panels together in which at least a part of the connecting device also acts as a guiding means allowing the two panels to be joined together in alignment with one another. The connector and connection system is especially useful for joining a plurality of compressed straw building panels to form a straight wall, partition or similar structure in substantially the same plane, said structure being constructed without having any external fittings or without having to mask or otherwise hide any fasteners, fittings or the like across the joint between the panels.

5 Claims, 3 Drawing Sheets

COMBINED CONNECTING AND ALIGNMENT METHOD FOR COMPOSITE FIBER BUILDING PANELS

CROSS-REFERENCE TO RELATED APPLICATIONS

Claiming Benefit of 35 U.S.C. §19(e)

This patent application is related to U.S. provisional patent application, serial No. 60/306,751, filed on Jul. 20, 2001 by Derek J. Layfield.

TECHNICAL FIELD OF THE INVENTION

The present invention relates generally to a connector and connection system, particularly to a connector and connection system useful in the building and construction industries. More particularly, the present invention relates to a connecting device and a method of using the connecting device for joining two substantially planar substrates together in which at least a part of the connecting device also acts as a guiding means allowing the two substrates to be joined together in substantial alignment with one another.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. provisional patent application, serial No. 60/306,751 filed on Jul. 20, 2001, is hereby incorporated by reference in its entirety including figures.

BACKGROUND OF THE INVENTION

Modular building panels have been used to lessen the cost of constructing buildings such as houses, office partitions, walls and the like by minimizing the number of components required. Modular panels can be made in the factory and assembled on site, thus panels can be made more uniform in the factory which lessens the labor required for building the walls of a building or similar. However, when two or more building panels need to be joined together to form a wall the panels need to be more or less accurately aligned with each other in order to produce a smooth wall having a pleasing appearance.

In the past, compressed straw panels have required the use of external metal connectors to join two adjacent panels together. The metal connectors can take a variety of different forms. One particular form is a double saddle or double yoke arrangement interconnected through a web portion in opposed facing relationship. Each yoke or saddle straddles the end of one of the panels so that when the two panels are adjacent each other one yoke or saddle engages one panel and the other yoke or saddle engages the other panel to join the panels together when the connector is fastened to both of the panels. The use of previously available connectors, including the metal connector, have suffered from one or more problems or shortcomings. One of the major disadvantages of using metal connectors is alignment of two adjacent panels when joining them together. As the metal connectors need to be reasonably flexible to accommodate adjustment of the panels the clips are made from relatively light weight metal with the effect that the clips can be easily bent nut of shape when joining two panels together which causes misalignment of the panels when forming the wall or partition. Additionally, the metal clips require fastening to the outside surfaces of the panels by suitable fasteners such as nails, screws and the like, which results in part of the clips being exposed on the external surfaces of the wall panels. The exposure of the metal clips is unsightly and detracts from the appearance of the walls as well as having the potential to inflict damage and injury. Extra operations to finish the wall are tea tilted in order to mask or cover the clips such as, for example, by plastering over the clips. This extra finishing operation is time consuming and expensive in materials and labor costs. Additionally, because of the light weight nature of the clips the wall panels can flex or move slightly with respect to each other which in turn has a tendency to crack the plaster covering the clip which ultimately exposes the clip and leads to increased misalignment of the panels. Another problem of using existing clips is that they do not provide any means for aligning the two panels with respect to each other when joining the panels together. As the clips can move or distort when the panels are being positioned in abutting relationship, it is difficult to accurately align the panels and maintain the panels in this aligned position while fixing the panels into place. Even if the panels were originally aligned, the use of the clips does not necessarily maintain the panels in alignment.

One example of the modular building panels used to make walls, partitions or the like is straw-based panels made of compressed straw sandwiched between layers of paper or paperboard. Wheat, rice or other types of straw are typically used therein. An example where modular compressed straw panels are used is in the construction of exterior walls wherein said modular panels are used as both structural and insulting members, thus eliminating the need for spaced studs, interior sheet rock and insulation placed there between. In interior partition applications, for example, modular building panels might be used in lieu of hollow panels comprised of a framework supporting planar surface members on each side thus providing improved structural and acoustic properties. The use of previously available connectors, including the metal connector discussed supra, has consistently suffered from one or more problems or shortcomings. One of the major disadvantages of using metal connectors is alignment of two adjacent panels when joining them together. The metal connectors need to be reasonably flexible to accommodate adjustment of the panels, so the clips are made from relatively light weight metal with the effect that the clips can be easily bent out of shape when joining two panels together which causes misalignment of the panels when forming the wall or partition. Additionally, the metal clips require fastening to the outside surfaces of the panels by suitable fasteners such as nails, screws and the like, which results in part of the clips being exposed on the external surfaces of the wall panels. The exposure of the metal clips is unsightly and detracts from the appearance of the walls as well as having the potential to inflict damage and injury. Extra operations to finish the wall are then required in order to mask or cover the clips such as, for example, plastering over the clips followed by taping and bedding the joints. This extra finishing operation is time consuming and expensive in materials and labor costs. Additionally, because of the light weight nature of the clips the wall panels can flex or move slightly with respect to each other which in turn has a tendency to crack the plaster covering the clip which ultimately exposes the clip and leads to increased misalignment of the panels.

Another, and perhaps more significant problem of using existing connecting means, is that they do not provide any means for aligning the two panels with respect to each other when joining the panels together. As existing connecting means can move or distort when the panels are being positioned in abutting relationship, it is difficult to accurately align the panels and maintain the panels in this aligned position while fixing the panels into place. Even if the panels are initially aligned, the use of the existing connecting apparatuses does not necessarily maintain the panels in alignment over the long term.

Therefore, there is a need for a connecting system for modular panels that overcomes the shortcomings of currently available connecting means by not only connecting modular panels together, but also aligning said panels prior to and during connection. Further, there is a need for a connecting system for modular panels that is not exposed to the exterior wall surface, thus not requiring additional finishing.

SUMMARY OF THE INVENTION

The present invention relates generally to a connector and connection system, particularly to a connector and connection system useful in the building and construction industries. More particularly, the present invention relates to a connecting device and a method of using the connecting device for joining two substantially planar substrates together in which at least a part of the connecting device also acts as a guiding means allowing the two substrates to be joined together in substantial alignment with one another. Further, the present invention relates to a connection system for joining a plurality of building panels together, particularly panels composed of compressed straw, to form a straight wall, partition or similar structure in substantially the same plane. Said structure being constructed without having any external fittings or without having to mask or otherwise hide any fasteners, fittings or the like across the joint between the panels.

BRIEF DESCRIPTION OF THE DRAWINGS

The present invention will now be described by way of example with reference to the accompanying drawings in which.

DETAILED DESCRIPTION OF THE INVENTION

Figure 1:
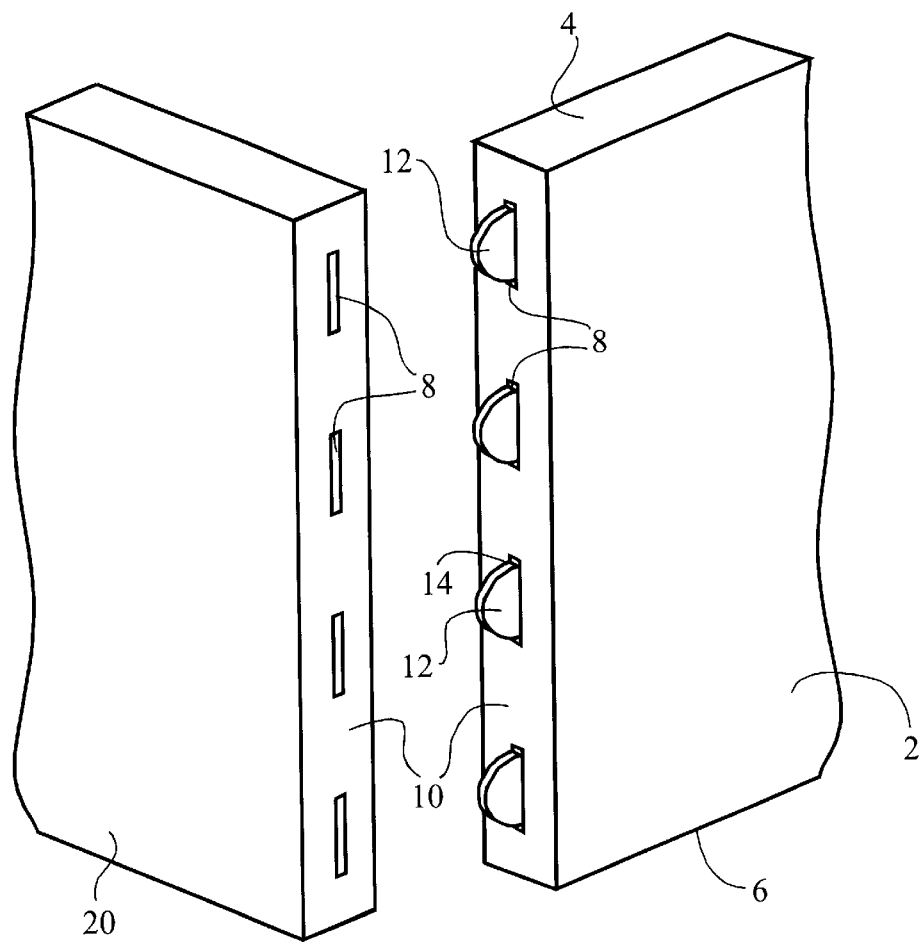
FIG. 1 is a perspective view of two panels being joined by the connection system of the present invention in which one panel is shown provided with four connectors and the other panel with four recesses in a position where the two panels are not in alignment with each other.

The invention discussed herein describes a system that provides for the easy alignment and connection of modular panels. Said invention is comprised of at least two panels, a connector and at least one receiving means in each panel. Said connector may take the form of a disc or any substantially flat and substantially bilaterally symmetric shape. Said receiving means may commonly take the form of a recess in said panel. Said recess generally having the form of a slot and having a shape that substantially matches one half of said symmetric connector.

Although the present invention will be described with particular reference to one form of the connector and connecting system in the form of a substantially circular disc, it is to be noted that the scope of the present invention is not limited to the described embodiment but rather the scope of the invention is more extensive so as to include other forms and arrangements of the connector and the connecting system and to the use of the various forms of the connectors in joining substrates together in more or less accurate alignment with each other.

Typically, the connector is a substantially flat or planar member that can adopt any suitable or convenient shape. Connector shapes include, but are not limited to, circular discs, elliptical discs, discs of any polygonal shape including square plates, rectangular plates, or any other shape. Said connector having a first and second part. The first part of said connector is that part which is received in the receiving means of a first substrate that is in position and securely located in place during construction of a wall. The second part of said connector is the part of the connector opposite the first part and is the part received in the receiving means of a second substrate as the second substrate is in abutting relationship with the first substrate. The second part of the connector is the guide means which extends outwardly from a one edge of the fixed substrate, typically a vertical side edge.

Typically, the first and second parts of the connector are the two halves of one disc with the first half and second half being essentially identical to each other and being different parts of the same disc, essentially mirror images of one another. As discussed supra, however, this connector may take a variety of generally flat shapes.

The external surface or surfaces of the connector may either be smooth or rough. When an adhesive is used to secure said connector to said first and second substrate, a roughened external surface may be required to enable a better bond with the adhesive. Further, the surface may be imparted a variety of textures with the texture pattern taking any suitable form or arrangement and having any suitable depth. One preferred surface treatment is the roughened side of masonite or similar hardboard, compressed board, manufactured board or the like.

Typically, said substrate is a building panel. In this disclosure, the building panel is a modular panel comprised of a compressed straw core lined on all sides by paper or paperboard. The compressed straw is arranged in layers with the straw fibers in substantially parallel orientation extending transversely across the panel from side to side when the panel is in a normal in-use orientation.

For better illustration, subject panels are typically rectangular in shape. In a typical application, said panels will be oriented such that the longer edges are substantially vertical and the shorter edges are substantially horizontal. In this orientation, said straw fibers will be assume a generally horizontal orientation.

In a typical configuration, said compressed straw panels have vertical edges (side faces) that are in opposed face to face relationship with each other when two adjacent panels are in abutting relationship with each other. Typically, the side faces are substantially squared, thus enabling a flat face to face contact between abutted panels. The front and rear faces of said panels may be tapered near the vertical side edges. Said taper provides a slight depression when panels are properly installed and are abutted edge to edge. Typically, the depression is covered with a suitable strip or similar, such as tape in order to provide a smooth finish to the joint or to completely mask the joint.

Compressed straw panels tend to exhibit greater integrity along their vertical edges or sides rather than along their horizontal edges when in the normal in-use orientation, described supra. Therefore, receiving means for accepting subject connectors are located in the vertical edges of the panel. Typically, the receiving means is a trench, groove, slot, cut out or similar recess for receiving part of said connector, and extends through a plurality of fiber/straw layers. The receiving means are provided in one or both side edges of the panels and each edge may be provided with a plurality of receiving means. Said receiving means will be shaped to substantially match the outer shape of one half of said connector. As disclosed in the drawings herein, when in place, outer surface of said connector will the contact the inner surface of said receiving means at all places except the top and bottom edges of said receiving means near the panel edge. A gap between said connector and said receiving means at the top and bottom edges provides for panels to be more easily guided into alignment during installation.

The shape of the receiving means or recess typically corresponds to the shape of the connector and the size of the recess is sufficient to accommodate receiving said connector. In a typical example, the recess is circular, part circular, curved, elliptical or similar. Correspondingly, the connector is like shaped, ie., circular, curved, elliptical or similar. The radius of curvature of the recess is slightly greater than the curvature of the connector and is of a slightly larger size to permit adjustable movement of the second panel with respect to the fixed panel during alignment and connection. The recess will typically be sized to allow only vertical adjustment between abutted panels, and not horizontal movement. The depth of the recess will be sized to accept approximately half of the connector therein.

The length of the opening of the recess is typically longer than the length of the connector so that there is clearance between the edges of the recess and the connector to allow the second panel to be brought into contact with the fixed panel at an angle or while being slightly inclined to the fixed panel.

Accordingly, the width of the recess will about the same dimension as the thickness of the connector providing a snug fit and preventing the panels from moving with respect to each other in any direction substantially perpendicular to the panel faces.

Each building panel is provided with one or more recesses. Importantly, the recesses of different panels are in alignment with each other when the panels are in their normal in-use positions. Typically, each panel is provided with spaced apart recesses along one side edge and with combinations of recesses and connectors along the opposite side edge. This configuration acts to further enhance the ease with which said panels are installed as pluralities of panels are easily aligned and connected in a systematic manner. For example, a group of panels will each be provided with four receiving means on each left and right edge. Accordingly, receiving means on left edges will be each provided with a connector fixably attached therein.

The connector is typically fixed into the recess by a suitable chemical or mechanical fastening means. Typical chemical fastening means include adhesives, glues, bonding agents or the like. Typical mechanical fastening means include nails, screws, dowels, pins or similar. Typically, the recess is provided with an internal fixing arrangement in which the connector and recess are each provided with complementary parts of the internal fixing arrangement.

Figure 2:
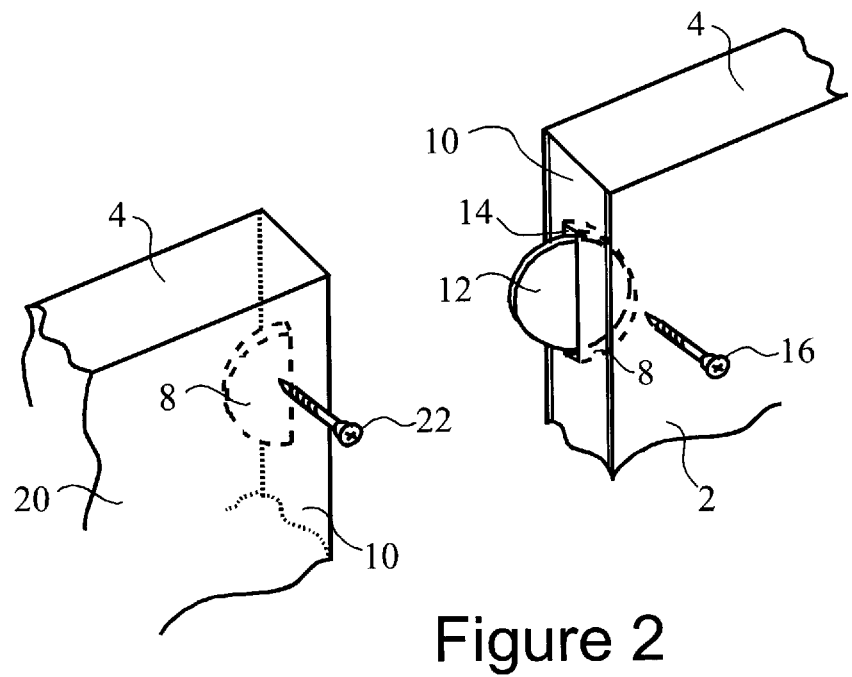
FIG. 2 is a close-up perspective view of one form of the connection system of the present invention showing one form of the connector in the receiving means and one form of fastening means lined up accordingly.

Referring now to FIGS. 1 and 2, wherein one form of the connection system of the present invention is detailed. Fixed panel (2) is provided in place forming part of the wall to be formed using the compressed straw panels. Panel (2) is made from compressed straw in which the individual fibres of straw are oriented to lie substantially horizontally in parallel relationship with the upper and lower ends (4, 6) of panel 2. Four separate semicircular recesses (8) are formed at regular spaced apart intervals over the length of side edge (10) of panel (2). Recess (8) is substantially semi-circular as shown more particularly in FIGS. 2, 3 and 4.

A connector disc (12) is located within each recess (8). Connector (12) can take any suitable shape or form. One particularly preferred shape is a circular disc. Disc (12) may be made from any suitable material and be made in any suitable size and in any suitable shape. Importantly, to insure a quasi-rigid fit, the shape of the connector will be substantially the same as the shape of the recess. One particularly preferred material of disc (12) is hardboard such as, for example, masonite or similar compressed board. The width of recess (8) corresponds to the thickness of disc (12) so that disc (12) is snugly received in recess (8) without any appreciable sideways movement, play or clearance. This assists in alignment of the two panels.

In a preferred embodiment, the radius of curvature of recess (8) is slightly larger than the radius of connector (12) to permit substantially vertical adjustment of the panels with respect to each other when joining the panels together. However, it is to be noted that connector (12) is centrally located within recess (8) so that there is a gap (14) between the circumference of the connector (12) and the edge of recess (8) along edge (10) of panel (2).

Disc (12) is securely fastened within recess (8) by a chemical or mechanical fastening means such as adhesive, glue or similar, or a nail, or screw (16) or similar. If a mechanical fastener is used the head of the fastener is recessed within the side face of panel (2) to provide for a smooth finished surface.

Either one or both outer surfaces of disc (12) are roughened or have a similar surface treatment so as to enhance the fixing of the disc within the recess, particularly if adhesive, glue or similar chemical bonding is used by partially filling recess (8) or coating the surfaces of disc (12).

Although four spaced apart recesses (8) are shown in FIG. 1, panel (2) can have any number of recesses and connectors located therein.

Continuing to refer to FIGS. 1 and 2, a second panel (20) is provided with four spaced apart semi-circular recesses (8) along the side edge (10). The spacing of recesses (8) of panel (2) is the same as the spacing of recesses (8) of panel (20) that when panel (20) is brought into abutting relationship with panel (2) the exposed parts of discs (12) can be received in recesses (8) of panel (20). It is to be noted that in FIG. 1, second panel (20) is shown oriented at about 90 degrees to the final aligned abutting position of the finished wall merely to more clearly show the arrangement of recesses (8), and not to show the abutting relationship which is shown in FIG. 2.

Operationally, panel (2) is manufactured and shipped from the factory in a configuration such that side edge (10) is provided with recesses (8) and discs (12) rigidly fixed therein and extending therefrom. The other edge of panel (2) is provided with recesses (8) only. All finished panels, for example, will be provided with a plurality of matching, like spaced, recesses along both side edges, while the recesses along the left side edge will be provided with connectors rigidly attached therein.

During installation, panel (2) is securely fixed in position as the first panel of an internal wall, partition or similar. After panel (2) is firmly fixed in position, a second panel (20) is taken and oriented so that side edge (10) of panel (20) having recesses (8) is facing toward side edge (10) of panel (2). Panel (20) is placed near panel (2) so that one of the connectors (12), preferably the lower most connector, is placed adjacent the lower most recess (8) of panel (20). In this orientation panel (20) is not vertical but rather is inclined to the vertical with the space between the respective tops of panels (2) and (20) greater than the distance between the respective bottoms of panels (2) and (20). Panel (20) in this inclined position is brought into alignment by discs (12) being received in each of the recesses (8) of panel (20) in turn. This manoeuvre is possible because of clearance gap (14) provided at either side of disc (12) by recess (8) in edges (10). Panel (20) can then be easily moved from being inclined to panel (2) to being directly vertically aligned along the edge (10) of panel (2). Panel (20) is then moved closer to panel (2) into aligned abutting relationship with all four discs (12) received in both sets of recesses (8) of the panels. The exposed part of connectors (12) when received in recesses (8) of panel (20) guide the position of panel (20) into alignment with panel (2) since there is no sideways clearance or play between the exposed part of connector (12) and recess (8) of panel (20).

Prior to inserting disc (12) into recess (8) the exposed surfaces of disc (12) can be coated with a suitable adhesive so that when panel (20) is in alignment with panel (2) disc (12) is adhered internally to the walls of recess (8) and fixed thereto. Alternatively, when disc (12) is received in recess (8) of panel (20) an external fastener in the form of a screw (22) can be used to retain the connector in the recess. Many alternative forms of external fasteners may be used in lieu of screw (22) such as a nail or a dowel pin in a suitably sized hole drilled through panel (2) and disc (12).

Figure 3:
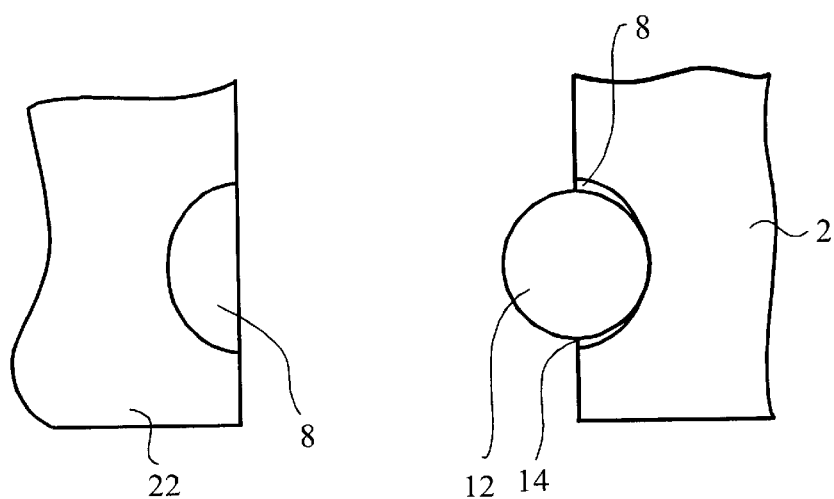
FIG. 3 is a partial cross-section view of the connection system of the present invention showing the two panels separated from each other in which each panel is provided with a recess and one panel is provided with a connector.
Figure 4:
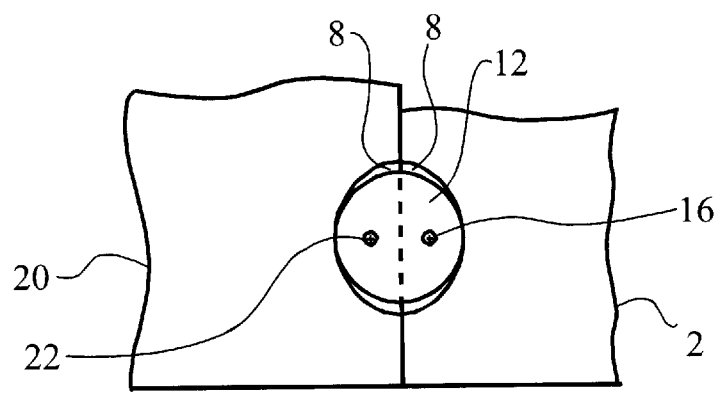
FIG. 4 is a partial cross-section view of one form of the connection system of the present invention showing the two panels in abutting relationship with the connector received in two opposed recesses.
Figure 5:
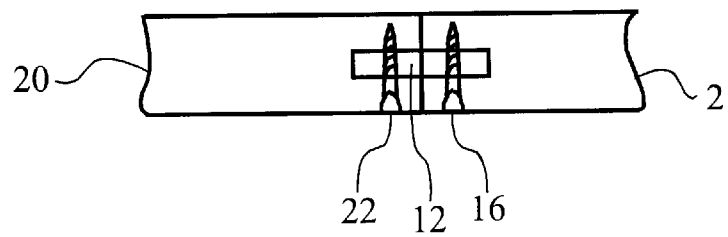
FIG. 5 is a partial cross-section view showing the connector fixed in place between two panels when in abutting relationship with each other.

FIGS. 3 and 4 further show the preferred relationship between connector (2) and recess (8) and further illustrates gap (14) that provides for the adjustment of panels (20) and (2) from a non-vertically parallel orientation to an abutted relationship with one another. FIG. 3 showing panels (2) and (20) spaced apart and FIG. 4 showing panels (2) and (20) in a final abutted configuration. FIGS. 4 and 5 show external fasteners (22) and (16) placed through panels (20) and (2) respectively, and furthers shows both external fasteners (22) and (16) each placed through disc (12).

Figure 6:
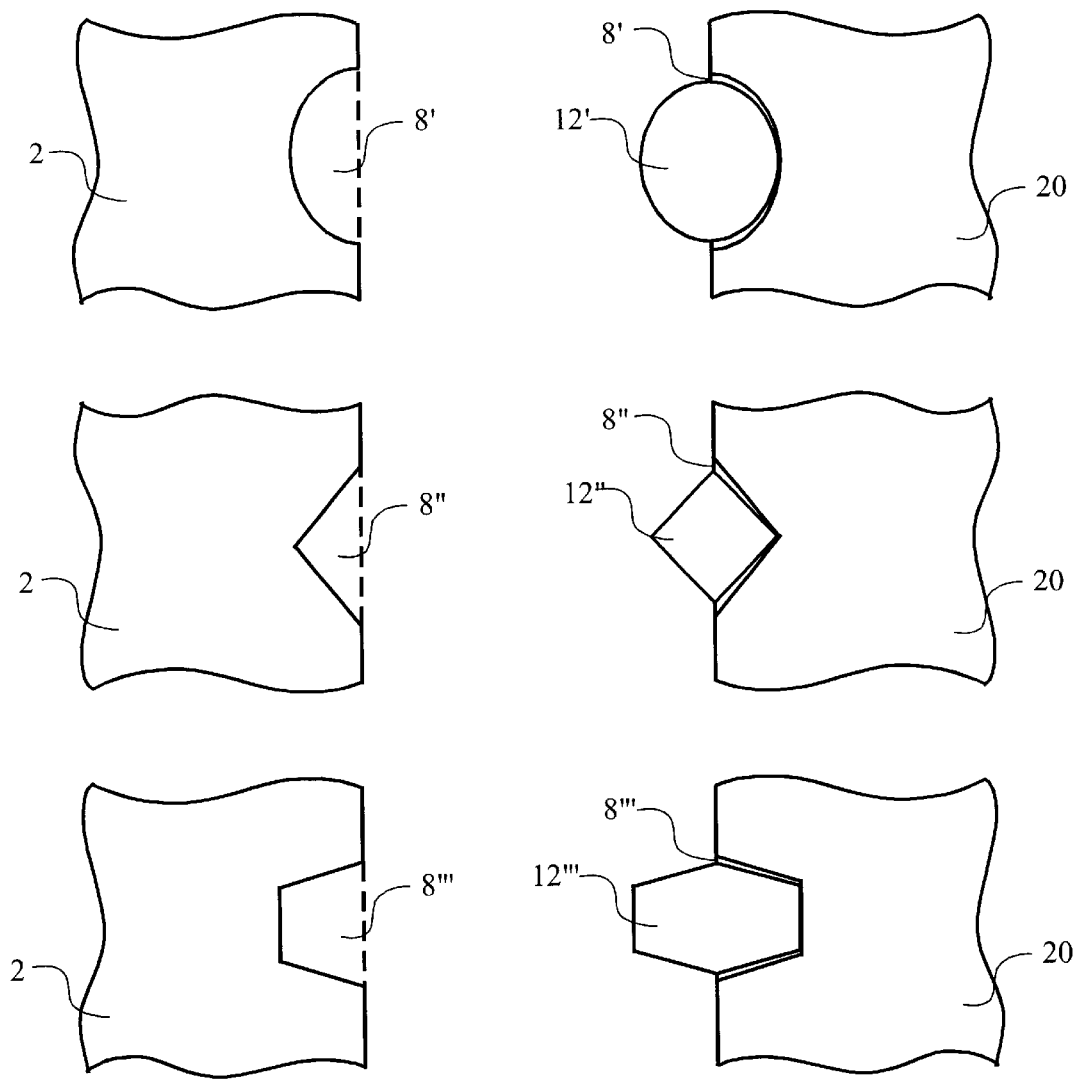
FIG. 6 is a partial cross-section view showing three embodiments of connectors each disposed within a like shaped receiving means (recess.

FIG. 6 illustrates three alternate embodiments of disc (12) in the form of a substantially elliptical plate (27), a substantially square or diamond shaped plate (28) and a hexagonal plate (29). FIG. 6 in no way illustrates every alternate embodiment possible, nor every alternate embodiment covered by the claims contained herein.

Advantages of the present invention include that the connector not only acts as a connector for joining the two building panels together in abutting relationship but also acts as a guide during assembly of the wall to ensure that the panels making the wall are aligned with each other.

If an adhesive is used between the parts of the connector and the recess no external fitting or fastener need be used to fix the connector in place in the two recesses.

By having a suitably sized gap between the connector and the ends of the recess, vertical adjustment of the panels with respect to each other is possible to assist in assembling or constructing the wall. Having the width of the recess about the same as the width of the connector obviates the need to have sideways or lateral adjustment since the two panels are horizontally aligned with each other because of this close fit.

The described arrangement has been advanced by explanation and many modifications may be made without departing from the spirit and scope of the invention that includes every novel feature and novel combination of features herein disclosed.

Those skilled in the art will appreciate that the invention described herein is susceptible to variations and modifications other than those specifically described. It is understood that the invention includes all such variations and modifications that fall within the spirit and scope.

What is claimed is:

1. A method for joining and rigidly fixing two substantially planar composite fiber building panels, each panel having a front and back surface bounded by a top, bottom, left vertical, and right vertical edge surfaces, each edge surface having a width approximately equal to the thickness of the panel, said method comprising the steps of:

providing a substantially flat and bilaterally symmetric shaped connector member, said connector member having a uniformly textured surface;

forming a first recess into a right or left edge of a first composite fiber panel, said recess having the general form of a slot oriented along said side edge recess defining a shaped cavity for concealably receiving a portion of said connector member, said recess being positioned at specific distance from said front surface and sized so that connector member may be received with a friction fit along a front recess surface and a rear recess surface, said first recess being further sized to provide a free space above and below connector member when said connector member is received therein;

installing and affixing said connector member into said first recess, a portion of said connector member remaining exposed from said recess;

forming a second recess into a right or left side edge of a second composite fiber panel, said right or left edge being chosen so as to be an opposing edge to the first panel edge, said second recess also having the general form of a slot oriented along said side edge recess defining a shaped cavity for concealably receiving said exposed portion of said connector member, said recess being positioned at said specific distance from said second panel front surface and sized so that said connector member may be received with a friction fit along a front recess surface and a rear recess surface, said second recess being further sized to provide a free space above and below connector member when said connector member is received therein;

arranging said first and second panels such that said opposing edges are juxtaposed; and assembling the two panels to each other by moving said first and second panels together such that said opposing edges are in contact, and said exposed portion of the connector member acts as an alignment guide and is received into the second recess, thereby concealing the connector member and rendering the front surfaces of the two panels in a co-planar orientation.

2. The method as set forth in claim 1 wherein said step of providing a connector member comprises providing a disc connector member having a shape selected from the group of circular, elliptical, square, rectangular, and polygonal.

3. The method as set forth in claim 1 wherein said steps of forming a first and second recess comprises forming a recess selected from the group of a slot, trench, groove, and cavity.

4. The method as set forth in claim 1 wherein said step of affixing said connector member into said first recess comprises a step selected from the group of glueing, adhering, bonding, nailing, screwing, pinning, bolting, stapling, riveting, and doweling.

5. The method as set forth in claim 1 wherein said step of assembling the two panels to each other comprises affixing said connector member into said second recess using a step selected from the group of glueing, adhering, bonding, nailing, screwing, bolting, riveting, stapling, pinning, and doweling.

* * * * *